United States Patent
Bagagli et al.

(10) Patent No.: US 9,297,373 B2
(45) Date of Patent: Mar. 29, 2016

(54) DIFFERENTIAL PRESSURE VALVE WITH PARALLEL BIASING SPRINGS AND METHOD FOR REDUCING SPRING SURGE

(75) Inventors: Riccardo Bagagli, Florence (IT); Carmelo Maggi, Florence (IT); Alberto Babbini, Florence (IT); Leonardo Tognarelli, Florence (IT)

(73) Assignee: Nuovo Pignone S.P.A., Florence (IT)

( * ) Notice: Subject to any disclaimer, the term of this patent is extended or adjusted under 35 U.S.C. 154(b) by 502 days.

(21) Appl. No.: 13/548,405

(22) Filed: Jul. 13, 2012

(65) Prior Publication Data

US 2014/0014190 A1    Jan. 16, 2014

(30) Foreign Application Priority Data

Jul. 19, 2011 (IT) ................................ FI2011A0145

(51) Int. Cl.
| | |
|---|---|
| *F04B 39/10* | (2006.01) |
| *F16K 15/00* | (2006.01) |
| *F16K 15/02* | (2006.01) |
| *F16K 15/12* | (2006.01) |

(52) U.S. Cl.
CPC ........... *F04B 39/1053* (2013.01); *F16K 15/026* (2013.01); *F16K 15/12* (2013.01); *Y10T 137/0379* (2015.04); *Y10T 137/7832* (2015.04)

(58) Field of Classification Search
CPC ..... F04B 39/10; F04B 39/1013; F16K 15/025
USPC .......... 137/535, 529, 540, 543, 514; 251/337; 417/571, 569, 559, 563; 267/166, 267/166.1, 167, 174, 179, 168
See application file for complete search history.

(56) References Cited

U.S. PATENT DOCUMENTS

| | | | | |
|---|---|---|---|---|
| 1,742,755 | A | * | 1/1930 | Cataline et al. ................ 137/529 |
| 1,753,922 | A | * | 4/1930 | Erbach ................ F04B 39/0016 137/529 |
| 2,518,387 | A | | 8/1950 | Shaw |
| 3,507,486 | A | * | 4/1970 | Schwaller ........... F04B 39/1053 267/151 |

(Continued)

FOREIGN PATENT DOCUMENTS

| | | |
|---|---|---|
| CN | 1685153 A | 10/2005 |
| CN | 102022549 A | 4/2011 |

(Continued)

OTHER PUBLICATIONS

IT Search Report and Written Opinion dated Feb. 28, 2012 from corresponding IT Application No. FI20110145.

(Continued)

*Primary Examiner* — Devon Kramer
*Assistant Examiner* — Nathan Zollinger
(74) *Attorney, Agent, or Firm* — GE Global Patent Operation

(57) ABSTRACT

A differential pressure valve is disclosed, comprising: a valve body, the valve body having at least one flow inlet and one flow outlet; at least one shutter, the shutter being movable between an open position and a closed position under a differential pressure across the valve; a flow passage from the flow inlet to the flow outlet; at least one biasing member configured to bias the shutter towards a closed position so as to block the flow passage through the flow inlet. The biasing member comprises at least two springs arranged in parallel, one of the springs having at least one resonance frequency different from at least one resonance frequency of the other of the two springs.

18 Claims, 7 Drawing Sheets

(56) References Cited

U.S. PATENT DOCUMENTS

| | | | | |
|---|---|---|---|---|
| 3,862,751 | A | * | 1/1975 | Schwaller .................. 267/91 |
| 4,638,832 | A | | 1/1987 | Mokveld |
| 4,852,608 | A | * | 8/1989 | Bennitt .................. 137/516.13 |
| 5,694,977 | A | | 12/1997 | Clark |
| 5,765,590 | A | | 6/1998 | Kim et al. |
| 6,019,124 | A | * | 2/2000 | Sebion et al. ............. 137/454.4 |
| 7,249,937 | B2 | | 7/2007 | Inoue et al. |
| 8,147,225 | B2 | | 4/2012 | Kuny |
| 2010/0002489 | A1 | | 1/2010 | Lee et al. |
| 2010/0024891 | A1 | * | 2/2010 | Francini et al. ............ 137/14 |
| 2011/0168180 | A1 | * | 7/2011 | Lugtigheid ............. 128/205.14 |

FOREIGN PATENT DOCUMENTS

| | | |
|---|---|---|
| CN | 102066755 A | 5/2011 |
| FR | 2131709 A5 | 11/1972 |
| JP | 1188732 A | 7/1989 |
| JP | 2675540 B2 | 11/1997 |
| KR | 20070121938 A | 12/2007 |

OTHER PUBLICATIONS

Unofficial English Translation of Chinese Office Action issued in connection with corresponding CN Application No. 201210250766.6 on Sep. 2, 2015.

* cited by examiner

DIFFERENTIAL PRESSURE VALVE WITH PARALLEL BIASING SPRINGS AND METHOD FOR REDUCING SPRING SURGE

BACKGROUND OF THE INVENTION

The embodiments disclosed relate generally to differential pressure valves, i.e. to valves which are automatically actuated by the pressure difference across the valve. Some exemplary embodiments specifically relate to reciprocating compressor valves, such as in particular to poppet valves of hyper compressors.

Hyper compressors, those capable of producing gas pressure levels up to or above 3,000 bars, are widely used in industrial application, including, but not limited to, the production of low density polyethylene, or LDPE. The efficient performance of these compressors is controlled at least in part by suction and discharge automatic poppet valves. FIG. 1 illustrates a cutaway of a portion of a hyper compressor 2 of the conventional art comprising two poppet valves 10. FIG. 2 illustrates an enlarged section of one of the conventional poppet valves of the compressor shown in FIG. 1, in an opened position. A poppet guide according to the state of the art is disclosed in US-A-2010/0024891.

As shown in FIG. 1, a hyper compressor 2 usually comprises a casing 3 in which a cylinder 4 is formed. A piston rod 5 slides reciprocatingly in the cylinder 4 to suck a fluid from a suction duct 6 and discharge the fluid at a higher pressure in a discharge duct 7. A poppet valve 10 is arranged in each said suction duct 6 and discharge duct 7. In FIG. 1 reference number 10S designates the poppet valve in the suction duct 6 and reference number 10D designates the poppet valve in the discharge duct 7. Each poppet valve 10S, 10D is designed as shown in FIG. 2 and is designated 10 therein.

As shown in FIG. 2, the conventional poppet valve 10 includes a valve body 11 that contains therein a poppet, or poppet shutter, 12 configured to open and close the gas flow path in and out of the hyper compressor 1, a spring 14 configured to keep the poppet shutter 12 in a closed position against a closure seat 13 formed by a portion of the internal surface of the valve body 11, and a shutter guide 16 that contains the poppet shutter 12 and the spring 14. As shown, when the poppet shutter 12 is forced opened, a flow passage 17 (identified by several arrows in FIG. 2) is formed from a flow inlet 18 to a flow outlet 20 of the conventional poppet valve 10, the flow path being defined by the space formed between the poppet shutter 12 and the valve body 11 as well as between the shutter guide 16 and the valve body 11. The shutter guide 16 of the conventional poppet valve 10 further includes a discharge opening 22 along an axis A-A of the shutter guide 16 connecting an inside chamber 26 of the shutter guide 16 to the flow passage 17 in a region of flow stagnation, the back pressure in the inside chamber 26 being defined at least in part by the static pressure in the region of the flow passage 17 around the axis A-A of conventional poppet valve 10.

Opening and closing of the poppet valves 10, 10S, 10D is automatically controlled by differential pressure across the valves. These valves are therefore sometime called "automatic valves" and distinguish over controlled valves, such as those commonly used in internal combustion engines, where valve opening and closing is controlled by an external actuator, such as by way of a cam shaft.

The suction poppet valve 10S is arranged such that it opens when the pressure in the cylinder 4 of the hyper compressor 2 diminishes during the suction stroke of the piston rod 5. The pressure in the suction duct 6 overcomes the force of the spring 14; the differential pressure across the valve causes opening of the valve and fluid is sucked in the compressor cylinder 4. The discharge valve 10D is closed. Once the piston rod 5 reaches the bottom dead center, the movement is reversed and compression of the fluid in the cylinder starts. Increased pressure in the cylinder 4 automatically closes the suction valve 10S and opens the discharge valve 10D when the differential pressure across the discharge valve 10D, between the compressor cylinder 4 and the discharge duct 7, overcomes the force of the relevant spring.

At each closing movement the poppet shutter 12 of the relevant poppet valve 10, 10S, 10D strikes violently against the seat 13 of the valve body 11 and each opening stroke causes the poppet shutter 12 to strike against the shutter guide 16.

These poppet valves play an important role in the reliability of hyper compressors used in plants for the production of LDPE. The performance of such valves depends not only on selected material properties and a suitable design to withstand high operating gas pressures, but also on a proper dynamic behavior of the poppet shutter 12. The proper opening and closing of the valve are influenced by various design constraints related to several dynamic forces acting on the valve, including a drag force acting on the poppet shutter 12 and shutter guide 16 to open the valve, this drag force being generated by the interaction of the gas flow with the noted valve parts; a gas pressure force acting on the shutter guide 16 to close the conventional valve 10, this gas pressure force being generated by the flow back pressure acting on a back surface of the shutter guide 16; an inertia force associated with the mass of the poppet shutter 12; and a spring force generated by the spring 14 to close the valve, among others.

Hyper compressors operate usually in a speed range between 150 and 300 rpm. At each cycle all the valves perform an opening and closing movement with corresponding impacts of the poppet shutter against the seat 13 and against the shutter guide 16. Repeated impacts cause impact wear and frontal damages, which eventually results in poppet failure. Impact wear causes material consumption and surface irregularities that can crate favorite sites for the formation of cracks. These can propagate by impact fatigue due to the stress waves generated by dynamic loads caused by impacts, till final fracture of the poppet shutter. In case of high impact velocities, impact fatigue can nucleate cracks itself, even in the absence of impact wear.

When there are impact loads on the springs, the stress propagates along the spring wire. The end coil of the spring in contact with the applied load takes up whole of the deflection and then it transmits a large part of its deflection to the adjacent coils. This wave of compression travels along the spring indefinitely. Resonance will occur depending upon time traveled. This results in very large deflections and correspondingly very high stresses. Under these conditions, it is just possible that the spring may fail. This phenomenon is called surge. From another view point, an impact stress applied on the spring upon closing or opening of the shutter introduces a deformation of the spring according to a function which can be decomposed in a Fourier series which also includes harmonics corresponding to the resonance frequencies of the spring. Under some circumstance this can generate the above mentioned compression wave traveling along the spring. The high stress induced in the spring by resonance can eventually result in spring failure. If this occurs in an automatic valve of a reciprocating compressor the shutter will continue to operate but under abnormal operating conditions. Impact velocities of the shutter increase to very high values giving rise to frontal damage (impact wear and impact fatigue) of the shutter. Frontal damage generates cracks which rapidly propagate under dynamic stresses produced by repeated impacts till final failure of the valve, when the shutter breaks.

Spring surge can be induced also by gas dynamic forces (vortex shedding). These forces generate pressure oscillations with a frequency typically ranging between 100 and 1200 Hz, corresponding to one or more resonance frequencies of the valve spring.

Automatic valves are used not only in hyper compressors but also in other kinds of reciprocating compressors, commonly used for lower pressure ranges, e.g. between 100 and 1000 bar. These automatic valves comprise a valve stop with one or more outlet apertures and a valve seat with one or more inlet apertures. Disk-shaped or ring-shaped shutters, or valve plates, are arranged between the valve seat and the valve stop and are resiliently urged by springs against the opposing seat. Opening and closing is controlled by the differential pressure across the valve. These valves are commonly called "ring valves", to indicate the shape of the shutters used therein. Spring surge can arise also in this kind of automatic valves of reciprocating compressors, due to the effect of the impact loads on the spring upon opening and closing of the ring-shaped shutters.

It would therefore be desirable to develop an improved reciprocating-compressor valve, in particular an automatic valve, such as specifically a poppet valve for hyper compressors, where spring surge phenomena are suppressed or at least mitigated.

BRIEF DESCRIPTION OF THE INVENTION

According to some embodiments, therefore, a differential pressure valve is provided, such as in particular a reciprocating compressor valve, comprising: a valve body, the valve body having at least one flow inlet and one flow outlet; at least one shutter, the shutter being movable between an open position and a closed position under a differential pressure across the valve; at least one flow passage from the flow inlet to the flow outlet; at least one biasing member configured to bias the shutter towards a closed position so as to block the flow passage through the flow inlet, wherein the biasing member comprises at least two springs arranged in parallel, one of the springs having at least one resonance frequency different from at least one resonance frequency of the other of the two springs.

According to a further aspect, the subject matter disclosed herein concerns a reciprocating compressor, comprising: a cylinder; a piston slidingly arranged and reciprocatingly moving in the cylinder; a suction duct and a discharge duct in fluid communication with the cylinder; at least a suction valve in the suction duct and a discharge valve in the discharge duct; opening and closing of the suction valve and the discharge valve being automatically controlled by a differential pressure across the valve; and wherein at the suction valve and the discharge valve are differential valves comprising: a valve body, the valve body having at least one flow inlet and one flow outlet; at least one shutter, the shutter being movable between an open position and a closed position under a differential pressure across the valve; a flow passage from the flow inlet to the flow outlet; and at least one biasing member configured to bias the shutter towards a closed position so as to block the flow passage through the flow inlet, wherein the biasing member comprises at least two springs arranged in parallel, one of the springs having at least one resonance frequency different from at least one resonance frequency of the other of the two springs.

According to still another aspect, the subject matter disclosed herein relates to a method for mitigating or suppressing spring surge in a reciprocating compressor valve, the compressor comprising: a valve body, the valve body having a flow inlet and a flow outlet; a shutter, the shutter being movable between an open position and a closed position under a differential pressure across the valve; a flow passage from the flow inlet to the flow outlet; at least one biasing member configured to bias the shutter towards the closed position so as to block the flow passage through the flow inlet. The method includes suppressing propagation of resonance compression waves in the biasing member by arranging at least two springs in parallel, one of the springs having at least one resonance frequency different from at least one resonance frequency of the other of the two springs.

The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 16 illustrates a longitudinal section of a ring valve with non-linear resilient members according to a further embodiment, according to line XVI-XVI in FIG. 6A;

DETAILED DESCRIPTION OF THE EXEMPLARY EMBODIMENTS OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

The various advantages of the embodiments of the present invention will here below be discussed in connection with a poppet valve of a hyper compressor. It shall however be understood that some at least of the features of the invention can be embodied in automatic valves of reciprocating compressors of other types, such as ring-type valves.

One embodiment disclosed here below refers to a single poppet valve. It shall however be understood that at least some of the features disclosed herein could be embodied in a multi-poppet valve, i.e. a valve including more than one poppet shutter and relevant shutter guide. For example a valve stop including a plurality of guides for a plurality of poppet shutters can be used in combination with a valve seat with a plurality of suction openings, each corresponding to a respective poppet shutter.

Figure 1:
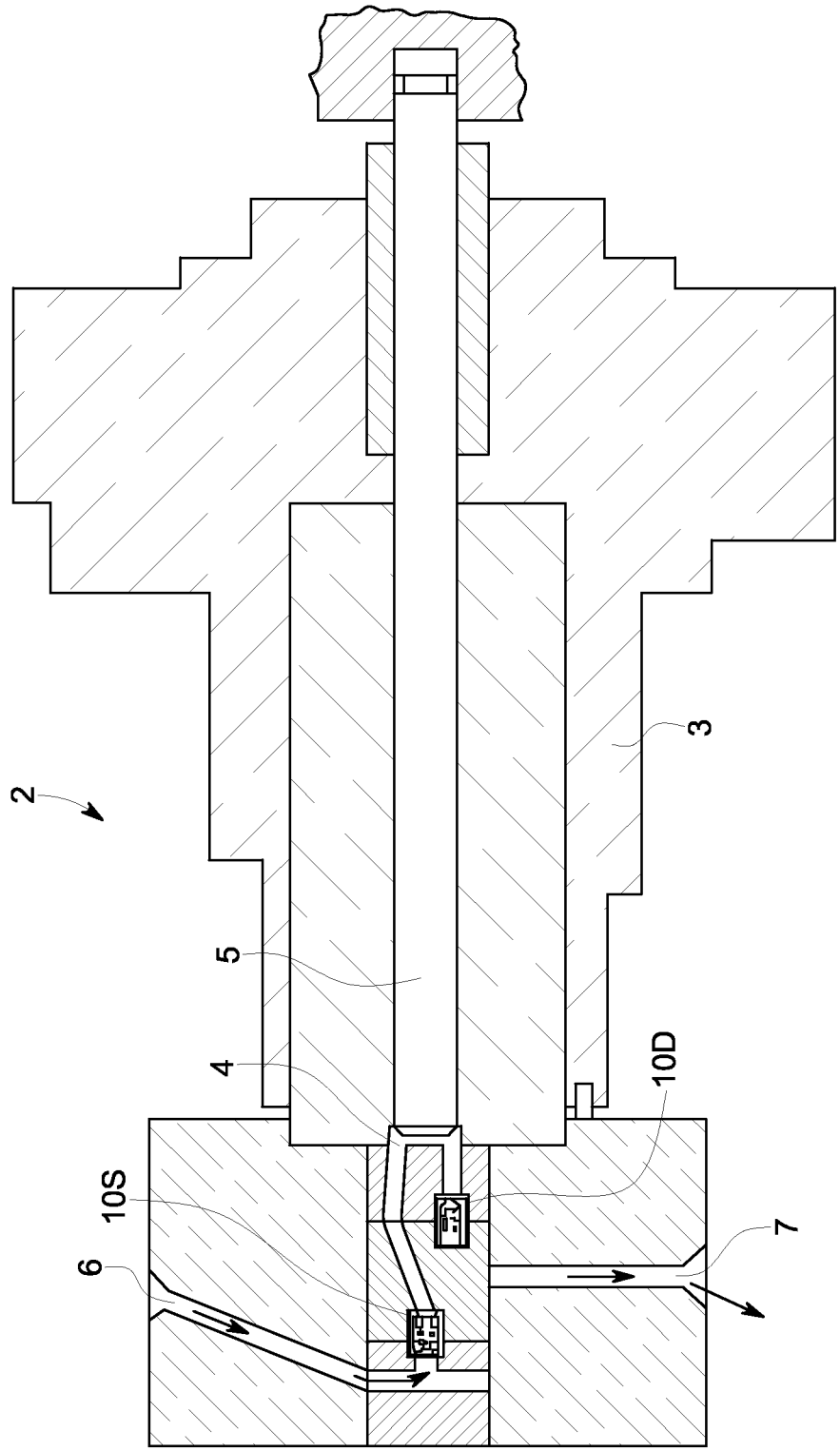
FIG. 1 shows a section of a portion of a reciprocating hyper compressor according to the state of the art.
Figure 2:
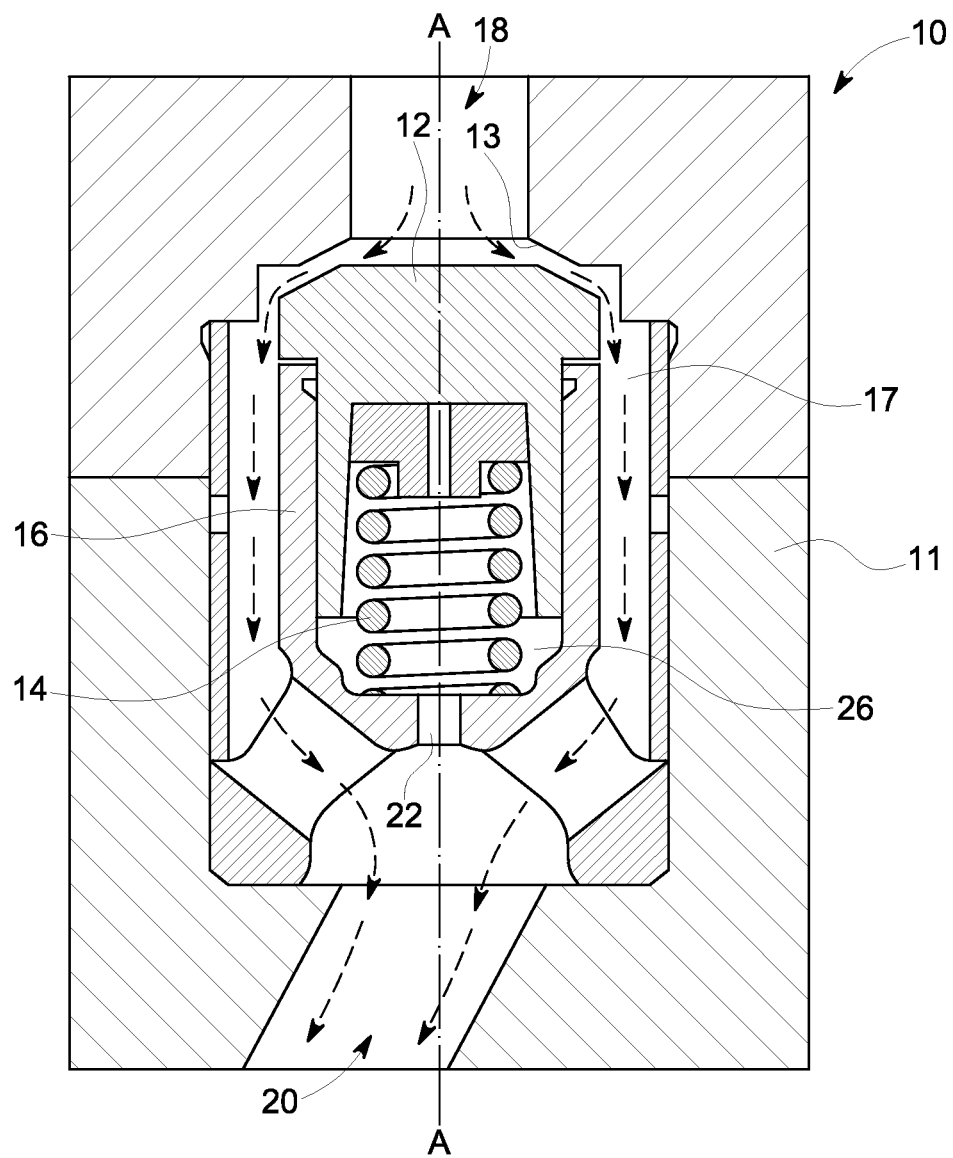
FIG. 2 illustrates a section along a longitudinal axis of a poppet valve for a hyper compressor according to the state of the art.
Figure 3:
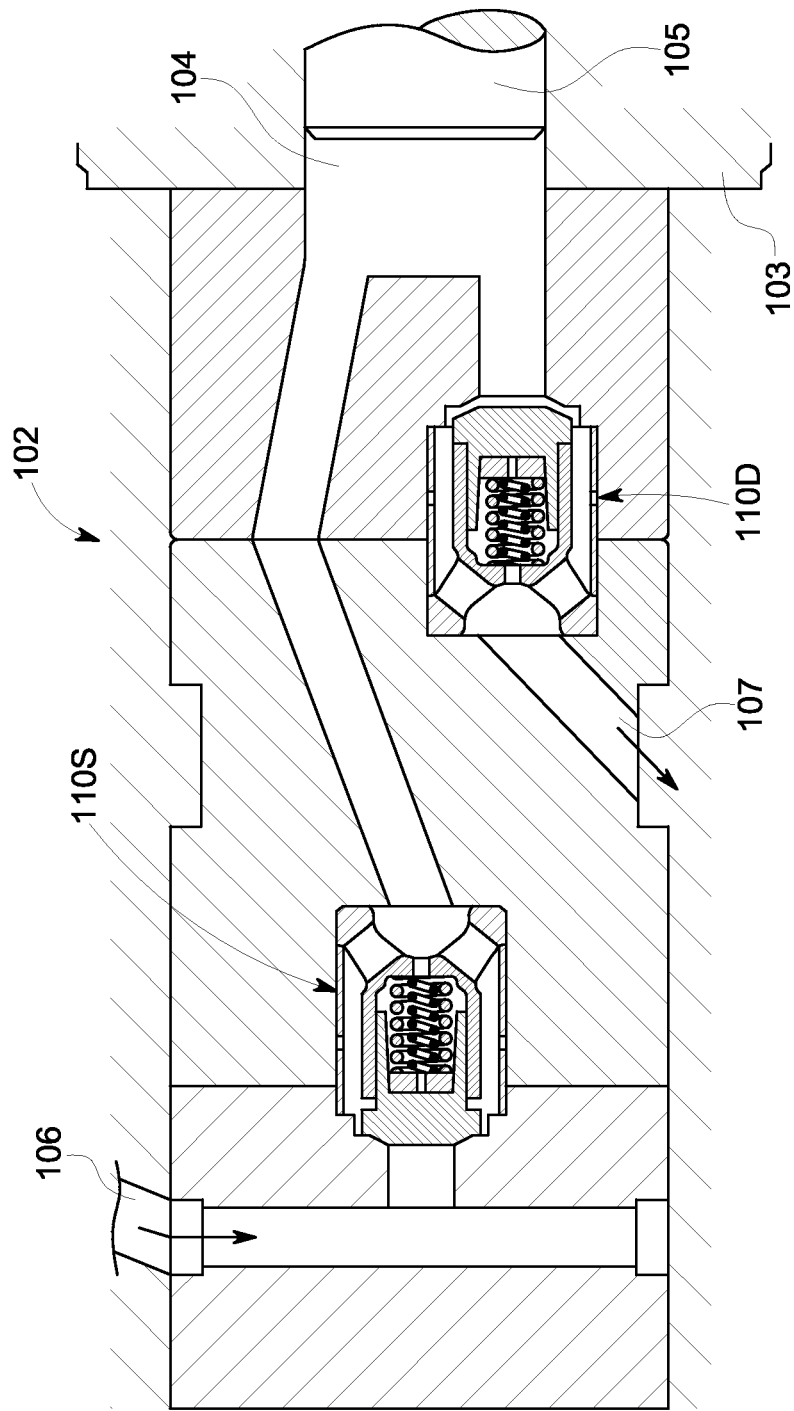
FIG. 3 illustrates a longitudinal section of a portion of a hyper compressor according to an exemplary embodiment.

Referring first to FIG. 3, the general structure of a hyper compressor will be described, limited to those parts which are important for an understanding of the invention. The hyper compressor 102 comprises a casing 103 in which a cylinder 104 is formed. A piston rod 105 slides reciprocatingly in the cylinder 104 to suck a fluid from at least one suction duct 106 and discharge the fluid at a higher pressure in at least one discharge duct 107. A respective poppet valve is arranged in each said suction duct 106 and discharge duct 107 respectively. Reference number 110S designates the poppet valve in the suction duct 106 and reference number 110D designates the poppet valve in the discharge duct 107. The arrangement of the suction duct and the discharge duct with respect to the cylinder 104 can be different from that shown in the drawings. In particular, the position of the valve axes with respect to the cylinder axis can be different and can depend upon the design values of the inlet and outlet pressure of the hyper compressor.

The piston rod 105 is actuated by a crank (not shown). In some embodiments the rotary speed of the crank is in the range between 150 and 300 rpm, i.e. the piston rod 105 performs a complete compression-suction movement 150-300 times/minute. Consequently, each valve 110S, 110D performs an opening-closing movement between 150 and 300 times/minute. The discharge pressure of the compressor ranges between 800 and 4000 bar, for example between 1500 and 3500 bar.

Figure 4:
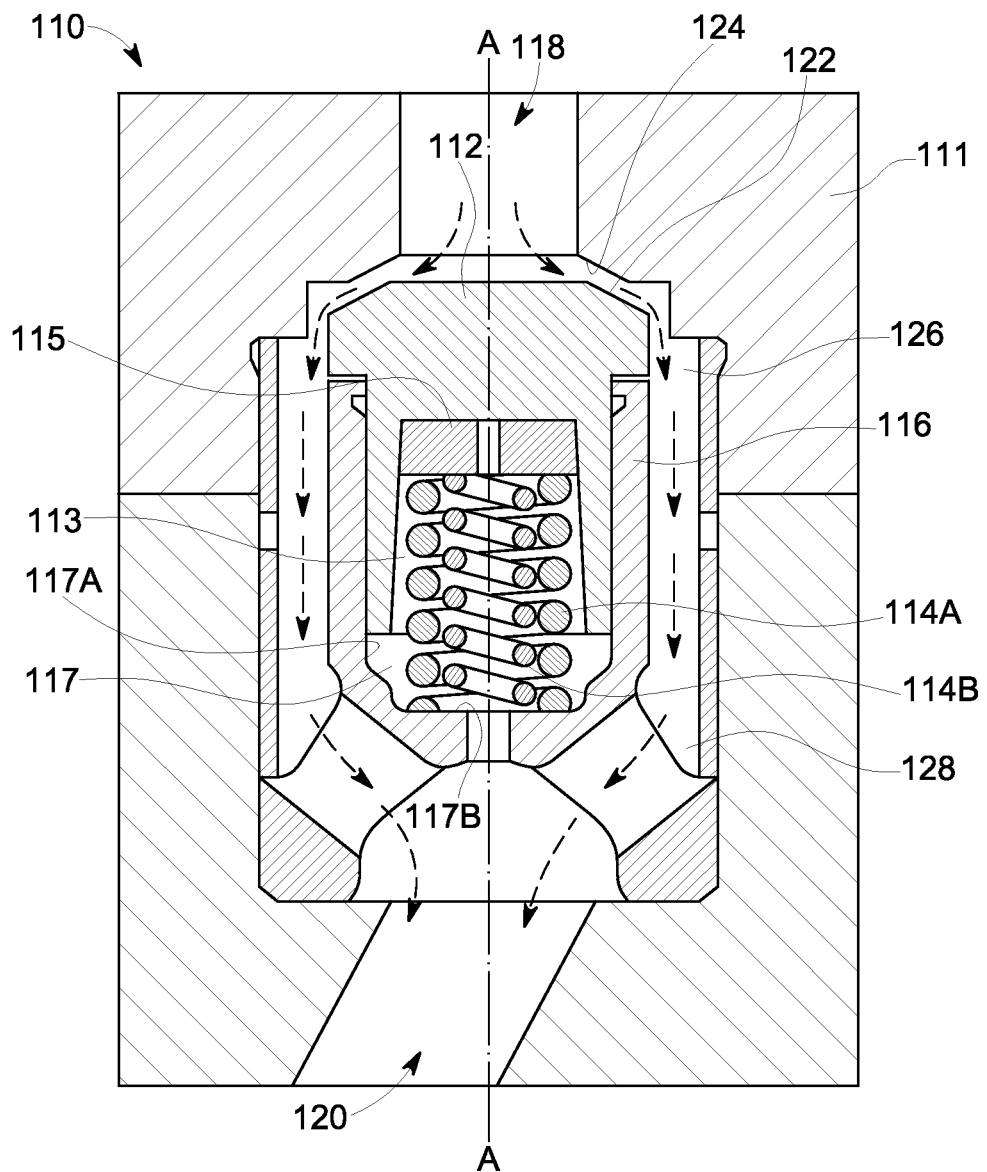
FIG. 4 illustrates a longitudinal section of a poppet valve in an opened position according to an exemplary embodiment.

Each poppet valve 110S, 110D can be designed as illustrated in the exemplary embodiment shown in FIG. 4, where the poppet valve is designated 110 as a whole and is shown in its open position, allowing gas to flow through the valve from the inlet toward the outlet.

The poppet valve 110 includes a valve body 111 having a valve axis A-A, a poppet shutter 112, a biasing member 114 and a shutter guide 116.

In some embodiments the poppet shutter 112 has an inner cavity 113 wherein a spacer 115 is disposed. The biasing member 114 is housed partly in the inner cavity 113 of the poppet shutter 112 and partly in an inner chamber 117 of the shutter guide 116. More specifically, the biasing member 114 is retained between the spacer 115 and a bottom surface 117B of the inner chamber 117 of the shutter guide 116. The surface 117A of the inner chamber 117 is in sliding contact with the outer surface 112A of the poppet shutter 112, such that the latter is slidingly guided by the shutter guide 116 during the opening and closing stroke of the poppet shutter 112. According to a different embodiment, the poppet shutter 112 can at least partly surround the shutter guide and can be guided by a shutter guide extending inside a poppet shutter cavity.

The poppet valve 110 also includes a flow inlet 118 and a flow outlet 120. In operation, the biasing member 114 biases the poppet shutter 112 away from the shutter guide 116 in a closed position where a portion 122 of a surface of the poppet shutter 112 rests against a closure seat 124 formed by a surface portion of the valve body 111, thereby preventing gas from flowing from the flow inlet 118 to the flow outlet 120 or vice versa. The spring 114 is suitably pre-loaded to provide sufficient closure pressure between the poppet shutter 112 and the closure seat 124. When the force exerted on the poppet shutter 112 by the differential gas pressure across the valve is higher than the biasing force of the spring 114, the poppet shutter 112 is moved to the opened position shown in FIG. 4, thereby allowing gases to flow from the flow inlet 118 to the flow outlet 120 through flow passages 126 formed between the poppet shutter 112 and an inner surface of the valve body 111 as well as between the shutter guide 116 and the inner surface of the valve body 111, as illustrated by the arrows 128 in FIG. 4.

In the exemplary embodiment shown in FIG. 4 the biasing member 114 comprises two pre-loaded compression helical springs 114A and 114B in parallel, arranged one inside the other. More specifically, the spring 114A has a larger diameter and is arranged around the smaller spring 114B. According to a different embodiment, not shown, the springs are arranged side-by-side rather than coaxially. The springs are arranged in a pre-loaded condition, such that absent any differential pressure across the valve, the poppet shutter 112 is biased by the springs 114A, 114B in sealing contact with the closure seat 124.

In one embodiment the springs 114A and 114B are linear springs, i.e. springs wherein the deflection varies linearly with the compressive load applied on the spring.

Each spring 114A, 114B is characterized by a (first) resonance frequency and multiples thereof. Usually if ω indicates first the resonance frequency of a spring, higher order resonant frequencies are 2ω (second order resonance frequency), 3ω (third order resonance frequency) . . . Nω (N-th order resonance frequency).

In some embodiments the springs 114A, 114B are designed such that at least the first resonance frequency (first harmonic) of one of said springs 114A, 114B is different from the first resonance frequency (first harmonic) of the other spring. In some embodiments also at least the frequencies of the second and preferably also of the third and possibly fourth order (second, third, fourth harmonic) are different for the two springs 114A, 114B. For example, if a first spring has a first resonant frequency at 100 Hz and subsequent resonant frequencies at 200, 300, 400 Hz, it is suitable to design the second spring such that neither the first nor the second, third and fourth resonant frequencies thereof are at 100, 200, 300 or 400 Hz.

If the operating conditions of the valve are such that a first one of the two springs would resonate at a first resonance frequency, the propagation of the compression wave along the spring will be opposed by the second one of the two springs, the first and subsequent resonance frequencies of which is different. The overall result of this arrangement will be a surge prevention or surge mitigation effect.

According to different embodiments, at least one of the two springs 114A, 114B is a non-linear spring, e.g. a progressive spring. In some embodiments both springs 114A, 114B are non-linear, e.g. progressive springs. The non-linear behavior of the springs causes surge suppression or surge reduction.

Figure 5:
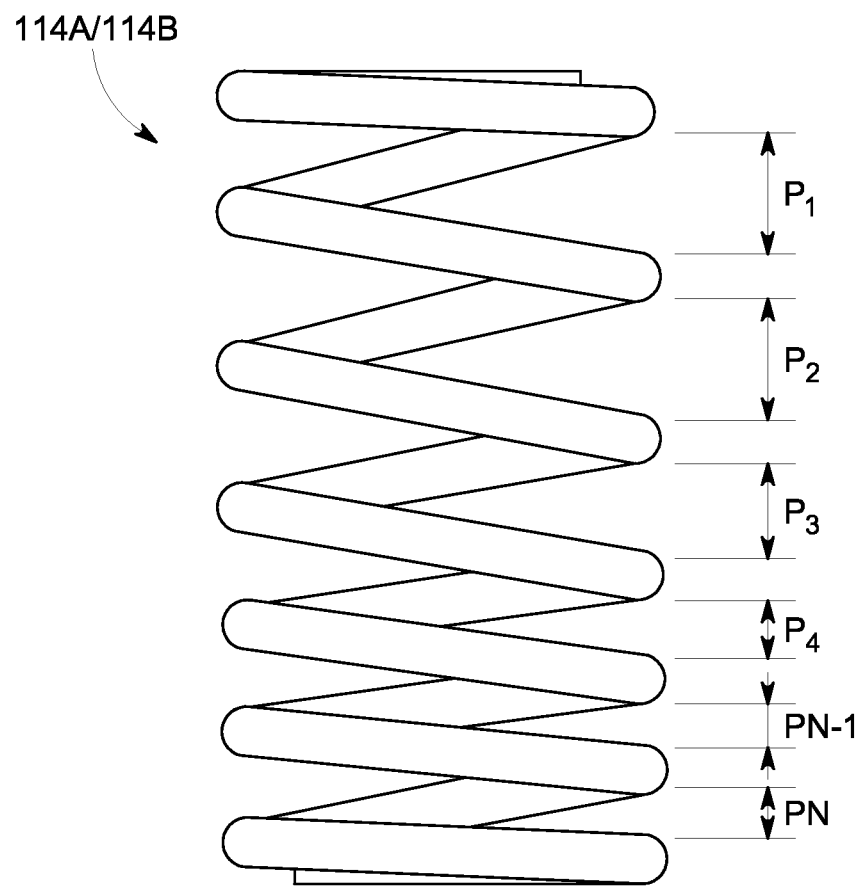
FIG. 5 illustrates a schematic side view of a progressive, non-linear helical spring.

In general terms, a non-linear progressive helical spring can be schematically represented by an arrangement of serially positioned springs having a variable stiffness. In general terms, such an arrangement can be obtained in different manners. FIG. 5 illustrates one embodiment of a helical spring wherein the pitch between the coils forming the spring varies along the axial extension of the spring. The pitches, i.e. the spacing between two adjacent active coils forming the spring 114A or 114B are labeled P1, P2, P3, . . . Pn−1, Pn. The pitch can vary stepwise from one end to the opposite end of the spring, though this is not mandatory; for example the pitch can decrease from each spring end towards the spring center or vice-versa.

The non-linear, progressive helical spring behavior suppresses or reduces surge phenomena as follows. Theoretically, in a common linear helical spring the total spring deflection is distributed uniformly among the various coils. This means that the distance between each pair of adjacent coils reduces to an identical extent until finally the coils contact each other. In the progressive helical spring the coils which are distanced by the smallest pitch will touch each other earlier than the remaining coils. This changes the stiffness of the coil. While compressive deflection increases, a progressively larger number of coils contact each other causing a gradual stiffness increase of the spring, until finally the maximum compressive deflection is achieved with all coils arranged in a minimum space arrangement, with each coil contacting the adjacent ones.

Since the stiffness of the progressive spring varies with deflection, the resonance frequency thereof also varies and propagation of compressive waves (spring surge) is suppressed or at least strongly reduced.

Combining two helical springs 114A, 114B, at least one of which is non-linear, and which have different resonance frequencies, increases the surge-suppression efficiency of the biasing member 114.

When at least one of the springs has an increasing stiffness, such as e.g. a progressive helical spring, the springs can be designed such that the stiffness increases stepwise by at least three different steps, i.e. such that the load-deflection curve has at least two knick points where the steepness of the curve varies with a discontinuity of the derivative thereof in the deflection range involved. The discontinuity corresponds to a stiffness change of the spring. Moreover, in some embodiments the ratio between two subsequent stiffness values is preferably comprised between 1.2 and 2, i.e.

$$1.2 < K_i/K_{i-1} < 2$$

where $K_i$ and $K_{i-1}$ are subsequent stiffness values of the spring.

Figure 6:
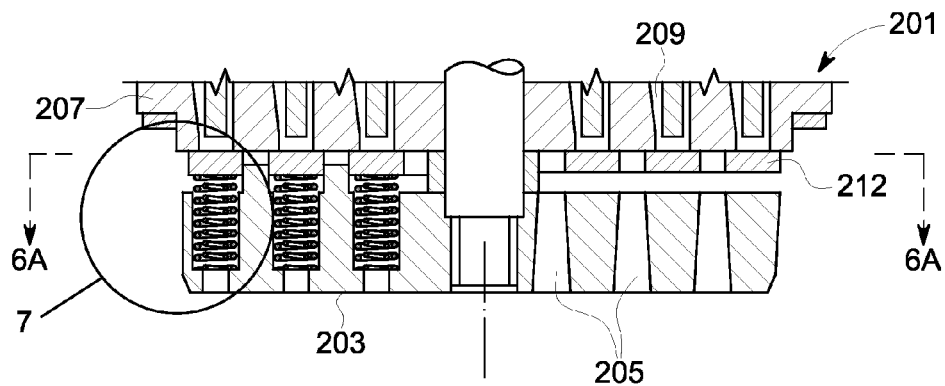
FIG. 6 illustrates a schematic section, according to line VI-VI in FIG. 6A, of a ring valve with parallel springs arrangements.
Figure 6A:
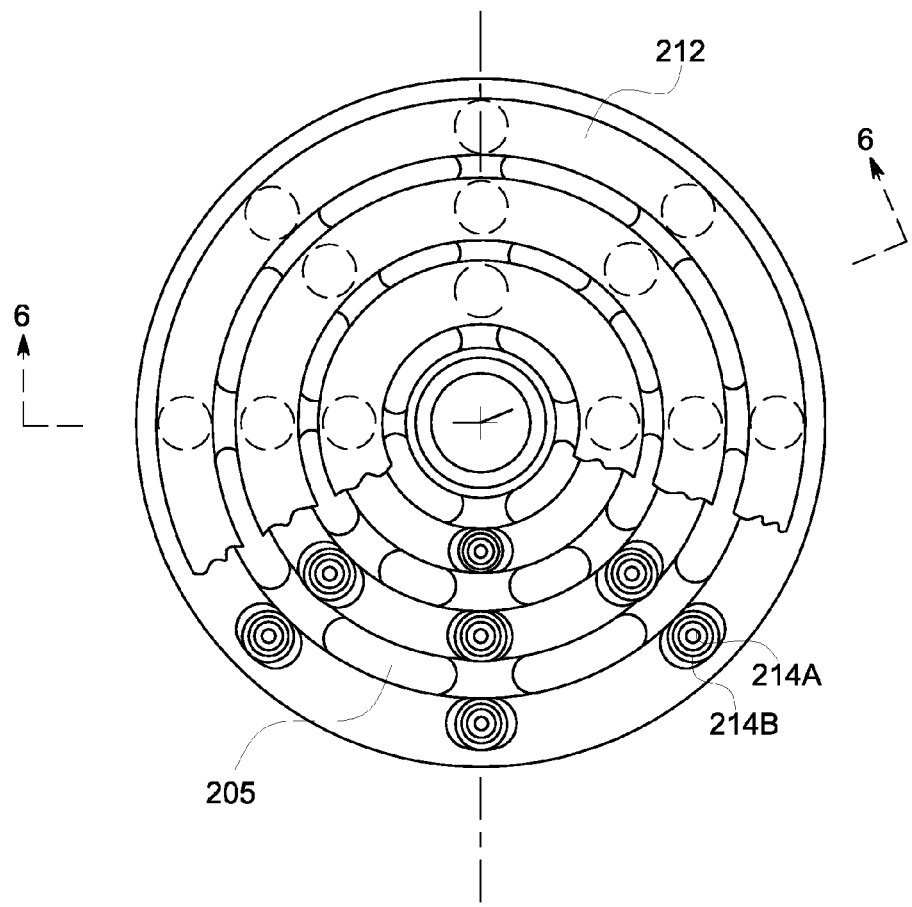
FIG. 6A illustrates a view according to line VIA-VIA of FIG. 6.
Figure 7:
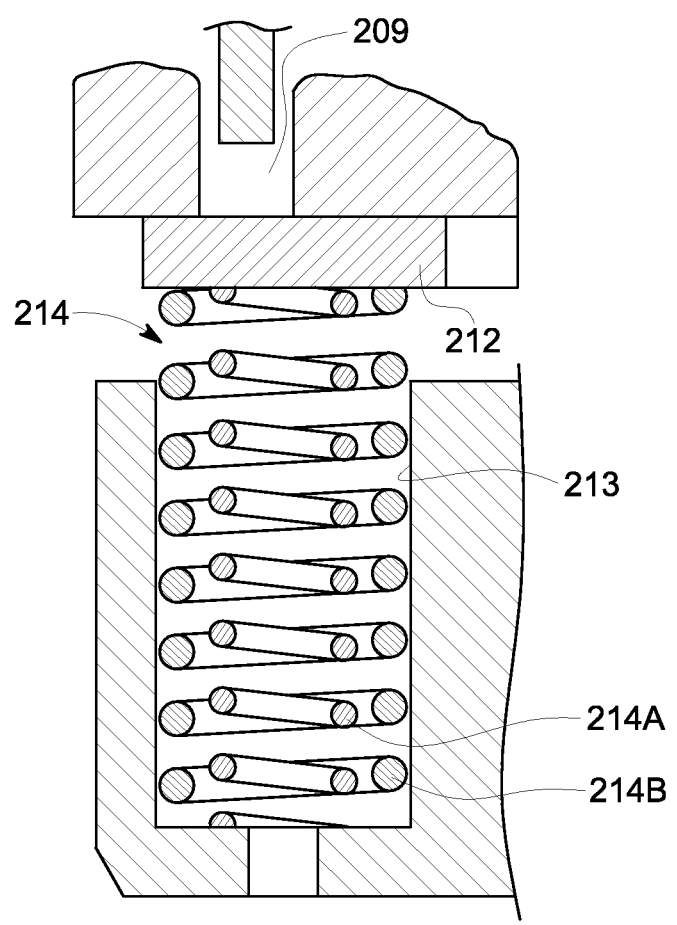
FIG. 7 illustrates an enlargement of a spring arrangement of FIG. 6.

FIGS. 6, 6A and 7 illustrate a further embodiment. In this embodiment a ring valve is designated 201 as a whole. The valve 201 comprises a valve body comprised of a valve stop 203 provided with annular through passages 205 and a valve seat 207 provided with annular through passages 209. Shutters in the form of concentrically disposed sealing rings 212 are arranged between the stop 203 and the seat 205. Each ring 212 is resiliently biased against the seat 207 by a plurality of biasing members 214 disposed along the annular development of the ring. Each biasing member 214 is housed in a housing 213 formed in the valve stop 203. According to some embodiments (see in particular FIG. 7) each biasing member 214 comprises at least two springs 214A, 214B. Each spring 214A, 214B can be a helical spring. In the embodiment disclosed in the drawings the springs 214A, 214B are coaxial, i.e. the smaller one is arranged in the empty space formed by the larger one of said springs. In some embodiments both springs 214A, 214B are linear. In alternative embodiments, one or both springs are non-linear, e.g. progressive springs.

By providing a biasing member comprising at least two springs having different resonance features, surge phenomena are suppressed or at least mitigated. More than two springs in parallel can be provided for enhanced surge suppressing effect if sufficient space is available. When the stress applied to the biasing member contains a frequency which is equal to or approximates the resonance frequency of one of said at least two springs, said spring tends to resonate. However, the compression wave propagation is contrasted by the other of said at least two springs.

In general terms, a differential pressure valve is one which is self-opening and self-closing based on the differential pressure across the valve, such as the differential pressure generated by a piston reciprocatingly moving in a cylinder of a reciprocating compressor.

Springs arranged in parallel are subject to the same deflection when biased under load.

In some embodiments, the two springs are helical springs. A particularly compact design is achieved if the springs are arranged co-axially, i.e. one inside the other.

The two springs can be linear springs. In other embodiments, one of the two springs is a non-linear spring, e.g. a progressive spring, the stiffness of which increase with increasing deflection. In still further embodiments both springs can be non-linear, e.g. progressive springs.

Particular advantages are achieved when the invention is embodied in a poppet valve of hyper compressors. According to some embodiments, the poppet valve comprises: a shutter guide fixedly arranged inside the valve body, the valve shutter being slidingly guided by the shutter guide; a flow passage from the flow inlet to the flow outlet, said flow passage being formed between an inside surface of the valve body and an outside surface of said shutter guide and of the shutter. The biasing member is at least partly housed in the shutter guide.

According to other embodiments the valve is a ring valve, such as an automatic ring valve for reciprocating compressors. Each ring is resiliently biased by a plurality of biasing members distributed along the annular extension of the ring. In some embodiments, each biasing member comprises at least two springs arranged in parallel, e.g. two helical springs. In some embodiments the two springs of each biasing member can be coaxial.

In some embodiments the compressor is a hyper compressor. In some exemplary embodiments the compressor rotates at between 150 and 300 rpm, i.e. the piston performs 150-300 cycles per minute, each cycle including a suction stroke and a reverse compression and discharge stroke. Consequently each suction and discharge valve in the compressor perform 150-300 opening and closing cycles per minute. According to some embodiments the compressor operates at a discharge pressure between 800 and 4500 bar, for example between 1500 and 3500 bar.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A differential pressure valve, comprising:
   a valve body, the valve body comprising at least one flow inlet and one flow outlet;
   at least one shutter, the shutter being movable between an open position and a closed position under a differential pressure across the valve;
   a flow passage from the flow inlet to the flow outlet; and
   at least one biasing member configured to bias the shutter towards the closed position so as to block the flow passage through the flow inlet;
   wherein the biasing member comprises at least two pre-loaded compression springs arranged in parallel, one of the springs comprising at least one resonance frequency different from at least one resonance frequency of the other of the two springs, wherein both the two springs are non-linear, and wherein the non-linear springs are progressive springs.

2. The valve according to claim 1, wherein the two springs are helical springs.

3. The valve according to claim 1, wherein the first resonance frequency of one of the two springs is different from the first resonance frequency of the other one of the two springs.

4. The valve according to claim 1, wherein at least the first three resonance frequencies are different for the two springs.

5. The valve according to claim 1, wherein the two springs are arranged co-axially.

6. The valve according to claim 1, wherein the at least one shutter is a poppet shutter, the valve comprising:
   at least one shutter guide fixedly arranged inside the valve body, the poppet shutter being slidingly guided by the shutter guide;
   wherein the flow passage is formed between an inside surface of the valve body and an outside surface of the shutter guide and of the poppet shutter;
   the biasing member being at least partly housed in the shutter guide.

7. The valve according to claim 1, wherein the at least one shutter comprises a sealing ring and wherein the sealing ring is biased by the at least one biasing member, and the at least one biasing member comprising the at least two springs arranged in parallel.

8. The valve according to claim 7, wherein the at least two springs are coaxially arranged helical springs.

9. A poppet valve comprising:
   a valve body, the valve body comprising at least one flow inlet and one flow outlet;
   at least one shutter guide disposed inside the valve body;
   at least one poppet shutter slidingly guided by the shutter guide;
   at least one flow passage from the flow inlet to the flow outlet, the flow passage being formed between an inside surface of the valve body and an outside surface of the shutter guide and of the poppet shutter; and
   at least one biasing member configured to bias the poppet shutter towards a closed position so as to block the flow passage through the flow inlet;
   wherein the biasing member comprises at least two springs arranged in parallel, one of the springs comprising at least one resonance frequency different from at least one resonance frequency of the other of the two springs, wherein both the two springs are non-linear and wherein the non-linear springs are progressive springs.

10. The valve according to claim 9, wherein the first resonance frequency of one of the two springs is different from the first resonance frequency of the other one of the two springs.

11. The valve according to claim 9, wherein at least the first three resonance frequencies are different for the two springs.

12. A reciprocating compressor comprising:
    a cylinder;
    a piston slidingly arranged and reciprocatingly moving in the cylinder;
    a suction duct and a discharge duct in fluid communication with the cylinder;
    at least a suction valve in the suction duct and a discharge valve in the discharge duct, opening and closing of the suction valve and the discharge valve being automatically controlled by a differential pressure across the valves, wherein the suction valve and the discharge valve are poppet valves comprising:
    a valve body, the valve body comprising at least one flow inlet and one flow outlet;
    at least one shutter, the shutter being movable between an open position and a closed position under a differential pressure across the valve;
    a flow passage from the flow inlet to the flow outlet; and
    at least one biasing member configured to bias the shutter towards the closed position so as to block the flow passage through the flow inlet,
    wherein the biasing member comprises at least two springs arranged in parallel, one of the springs comprising at least one resonance frequency different from at least one resonance frequency of the other of the two springs, wherein the two springs are non-linear and wherein the non-linear springs are progressive springs.

13. The compressor according to claim 12, operating at between 150 and 300 rpm.

14. The compressor according to claim 12, operating at a discharge pressure between 800 and 4000 bar.

15. A method for mitigating or suppressing spring surge in a differential pressure valve, the method comprising:
    providing the differential pressure valve, wherein the differential pressure valve is a poppet valve comprising:
    a valve body, the valve body comprising at least one flow inlet and one flow outlet;
    at least one shutter, the shutter being movable between an open position and a closed position under a differential pressure across the valve;
    at least one flow passage from the flow inlet to the flow outlet;

at least one biasing member configured to bias the shutter towards the closed position so as to block the flow passage through the flow inlet; and suppressing propagation of resonance compression waves in the biasing member by providing in the biasing member at least two springs in parallel, one of the springs comprising at least one resonance frequency different from at least one resonance frequency of the other of the two springs, wherein both the two springs are non-linear and wherein the non-linear springs are progressive springs.

16. A method for operating a reciprocating compressor, the compressor comprising: a cylinder; a piston sliding in said cylinder; a suction duct with a suction valve and a discharge duct with a discharge valve, each valve comprising at least one shutter, at least one biasing member configured to bias the shutter towards a closed position, the method comprising:

providing for each biasing member at least two springs in parallel, one of the springs comprising at least one resonance frequency different from at least one resonance frequency of the other of the two springs, wherein both the two springs are non-linear and wherein the non-linear spring are progressive springs;

reciprocatingly moving the piston in the cylinder to suck a gas in the cylinder at a suction pressure and discharge the gas from the cylinder at a discharge pressure;

selectively opening and closing the suction valve and the discharge valve by differential pressure across the valves; and the valve is a poppet valve.

17. The method according to claim 16, wherein the compressor is operated at between 150 and 300 rpm.

18. The method according to claim 16, wherein the discharge pressure is between 800 and 4000 bar.

* * * * *